(12) United States Patent
Karjee et al.

(10) Patent No.: US 11,071,038 B2
(45) Date of Patent: Jul. 20, 2021

(54) METHOD AND SYSTEM FOR MULTI-HOP PATH SELECTION FOR MOBILE ROBOTS BASED ON CLOUD PLATFORM

(71) Applicant: Tata Consultancy Services Limited, Mumbai (IN)

(72) Inventors: Jyotirmoy Karjee, Bengaluru (IN); Hemant Kumar Rath, Bhubaneswar (IN); Arpan Pal, Kolkata (IN); Ashwini Kumar Varma, Dhanbad (IN)

(73) Assignee: Tata Consultancy Services Limited, Mumbai (IN)

( * ) Notice: Subject to any disclaimer, the term of this patent is extended or adjusted under 35 U.S.C. 154(b) by 23 days.

(21) Appl. No.: 16/672,069

(22) Filed: Nov. 1, 2019

(65) Prior Publication Data

US 2020/0145900 A1   May 7, 2020

(30) Foreign Application Priority Data

Nov. 1, 2018  (IN) .............................. 201821041345

(51) Int. Cl.
| | | |
|---|---|---|
| *H04L 12/28* | (2006.01) | |
| *H04W 40/22* | (2009.01) | |
| *H04W 40/24* | (2009.01) | |
| *H04J 1/16* | (2006.01) | |

(52) U.S. Cl.
CPC ......... *H04W 40/22* (2013.01); *H04W 40/246* (2013.01)

(58) Field of Classification Search
CPC .... H04L 45/123; H04W 40/22; H04W 40/246

USPC ................. 370/252, 329, 386, 389
See application file for complete search history.

(56) References Cited

U.S. PATENT DOCUMENTS

| | | |
|---|---|---|
| D575,299 S | 8/2008 | Lee |
| D594,412 S | 4/2009 | Saft et al. |
| 7,693,939 B2 * | 4/2010 | Wu .................. H04W 40/16 709/203 |
| 7,861,149 B2 | 12/2010 | Wang et al. |
| D638,025 S | 5/2011 | Saft et al. |
| D661,314 S | 6/2012 | Marchetti et al. |
| D661,319 S | 6/2012 | Marchetti |
| D674,812 S | 1/2013 | Joseph |
| D695,769 S | 12/2013 | Tagliabue et al. |

(Continued)

*Primary Examiner* — John Pezzlo
(74) *Attorney, Agent, or Firm* — Finnegan, Henderson, Farabow, Garrett & Dunner LLP

(57) ABSTRACT

This disclosure relates generally to a method and system for multi-hop path selection for mobile robots based on cloud platform providing an optimal path for end-to-end communication in the multi-hop network. Multi-hop path selection for mobile robots, conventionally performed at mobile robot end, may not provide an optimal path as mobile robots are unaware of the global scenario of the multi-hop network. Further, computation at mobile robot end is not an energy efficient solution. The disclosed cloud system communicates the optimal path to the source mobile robot to reach the destination mobile robot through the plurality of Access Points (APs). Multi-hop path selection for mobile robots, currently performed at mobile robot end, may not provide an optimal path as mobile robots are unaware of the global scenario of the multi-hop network. The optimal path computed at cloud system increases the life-time of robotics network there by increasing the efficiency.

12 Claims, 8 Drawing Sheets

(56) References Cited

U.S. PATENT DOCUMENTS

| | | |
|---|---|---|
| D701,237 S | 3/2014 | Cho |
| D701,240 S | 3/2014 | Campiranon et al. |
| 8,983,778 B2 | 3/2015 | McCarthy |
| D736,249 S | 8/2015 | Omiya |
| D738,901 S | 8/2015 | Amin |
| D754,174 S | 4/2016 | Kim |
| D756,373 S | 5/2016 | Raskin et al. |
| D757,073 S | 5/2016 | Kim |
| D763,267 S | 8/2016 | Brunner et al. |
| 9,467,745 B1 | 10/2016 | Hotchkiss et al. |
| D772,266 S | 11/2016 | Eder |
| D777,747 S | 1/2017 | Derby et al. |
| D782,495 S | 3/2017 | Laska et al. |
| D789,377 S | 6/2017 | Vazquez |
| D790,561 S | 6/2017 | Torchin et al. |
| D809,545 S | 2/2018 | Ban et al. |
| 2011/0197157 A1 | 8/2011 | Hoffman et al. |
| 2014/0129951 A1 | 5/2014 | Amin et al. |

\* cited by examiner

METHOD AND SYSTEM FOR MULTI-HOP PATH SELECTION FOR MOBILE ROBOTS BASED ON CLOUD PLATFORM

PRIORITY CLAIM

The U.S. patent application claims priority under 35 U.S.C. § 119 to: India Application No. 201821041345, filed on Nov. 1, 2018. The entire contents of the aforementioned application are incorporated herein by reference.

TECHNICAL FIELD

The disclosure herein generally relates to mobile robots in a multi-hop network, and, more particularly, to a method and system for multi-hop path selection for mobile robots based on cloud platform.

BACKGROUND

In a cloud robotics system, communication between the robots and the cloud is vital for any application. Specifically, in wireless technology direct communication between the robots and the cloud is limited due to the deployment of robotic devices in a particular geographical region based on the characteristics of a network such as the distance between robotic devices, mobility of the robots and obstacles in the deployment scenario, etc. In such difficult scenarios, multi-hop communication provides an achievable solution to determine an optimal path between the robots and the cloud. The multi-hop communication can be achieved through relay robots, where the robots can transmit their data to the cloud through other relay agents such as Access Point, base station or gateways. However, this requires intra-robot communication, which is difficult due to the mobility nature of the robots. Moreover, the robots usually lack with high computation and communication power.

In an existing technique, the cloud robotics system enables to manage robotic devices in a wireless networking environment. The existing cloud robotics system identifies one or more robotic devices from a plurality of robotic devices to perform the task. However, this existing system has limitations in communicating information of robots to the cloud in a real-time scenario due to considerable factors such as distance, mobility of robots, multiple obstacles, environmental attenuation and thereof. Further, most of the robots limit in low computational power and communication capabilities due to insufficient knowledge sharing of neighboring robots for executing the task. The robotic devices do not have sufficient knowledge about the next hop robotic devices deployed to select for the best optimal path.

In another existing technique, a cloud computing system shares the robotic knowledge based on mobility pattern, position and computational power of the robots with other communicating nodes or robots such that an optimal path between the robot and the cloud is decided through direct or multi-hop communications. However, the robots are constrained devices with low computation and communication power. Computing optimal path for the robots to perform a specific task is a challenge for establishing a communication. Moreover, in most of the optimal path selection approaches robots dissipate more energy in the network thereby reducing the efficiency of the network.

SUMMARY

Embodiments of the present disclosure present technological improvements as solutions to one or more of the above-mentioned technical problems recognized by the inventors in conventional systems. For example, in one embodiment, a method and system for multi-hop path selection for mobile robots based on cloud platform is provided. The method comprises to determine an optimal path by a cloud system for establishing a communication between a source mobile robot and a destination robot among a plurality of mobile robots in the multi-hop network in accordance with a subnet information. The subnet information comprises of a network map and a cost map, wherein the subnet information is received from a plurality of Access Points (APs) in the multi-hop network. The determined optimal path defines a multi-hop sequence of Access Points (APs) selected from the plurality of Access Points (APs) to enable the communication between the source mobile robot and the destination mobile robot. Further, the optimal path is determined based on the dynamic path selection model to identify a plurality of paths for communication between the source mobile robot and the destination mobile robot by computing a forward link cost function and a backward link cost function. Here, the forward link cost function is computed for establishing a forward link between the source mobile robot and the destination mobile robot through each Access point (AP) starting from a first Access Point (AP) among the plurality of Access Points (APs) connected to the source mobile robot and a first set of intermediate Access Points (APs) among the plurality of Access Points (APs) that terminate at a second Access Point (AP) connected to the destination mobile robot, wherein the initial value of the forward link cost function at the first Access Point (AP) is set to zero. Then, the backward link cost function is computed for establishing a backward link between the destination mobile robot and the source mobile robot by computing a backward link cost function at each Access Point (AP) starting from the second Access Point (AP) connected to the destination mobile robot and a second set of intermediate Access Points (APs) among the plurality of Access Points (APs) that terminate at the first Access Point (AP) connected to the source mobile robot, wherein the initial value of the backward cost function is set to the computed final forward cost function at the second Access Point (AP). Further, the optimal path is selected for communication between the source mobile robot and the destination mobile robot from the identified plurality of paths comprising the multi-hop sequence of Access Points (APs), wherein an end-to-end forward link cost function and an end-to-end backward link cost function computed for the selected optimal path is minimum, and an end-to-end Outage Probability value for the optimal path is minimum and then the optimal path is communicated to the source mobile robot by broadcasting the optimal path through the plurality of Access Points (APs) to establish communication between the source mobile robot and the destination mobile robot.

In another aspect, a method and system for multi-hop path selection for mobile robots based on cloud platform is provided. The system comprises to determine an optimal path by a cloud system for establishing a communication between a source mobile robot and a destination robot among a plurality of mobile robots in the multi-hop network in accordance with a subnet information. The subnet information comprises a network map and a cost map, wherein the subnet information is received from a plurality of Access Points (APs) in the multi-hop network. The determined optimal path defines a multi-hop sequence of Access Points (APs) selected from the plurality of Access Points (APs) to enable the communication between the source mobile robot and the destination mobile robot. Further, the optimal path is determined based on the dynamic path selection model to identify a plurality of paths for communication between the source mobile robot and the destination mobile robot by computing a forward link cost function and a backward link cost function. Here, the forward link cost function is computed for establishing a forward link between the source mobile robot and the destination mobile robot at each Access point (AP) starting from a first Access Point (AP) among the plurality of Access Points (APs) connected to the source mobile robot and a first set of intermediate Access Points (APs) among the plurality of Access Points (APs) that terminate at a second Access Point (AP) connected to the destination mobile robot, wherein the initial value of the forward link cost function at the first Access Point (AP) is set to zero. Then, the backward link cost function is computed for establishing a backward link between the destination mobile robot and the source mobile robot by computing a backward link cost function at each Access Point (AP) starting from the second Access Point (AP) connected to the destination mobile robot and a second set of intermediate Access Points (APs) among the plurality of Access Points (APs) that terminate at the first Access Point (AP) connected to the source mobile robot, wherein the initial value of the backward cost function is set to the computed final forward cost function at the second Access Point (AP). Further, the optimal path is selected for communication between the source mobile robot and the destination mobile robot from the identified plurality of paths comprising the multi-hop sequence of Access Points (APs), wherein an end-to-end forward link cost function and an end-to-end backward link cost function computed for the selected optimal path is minimum, and an end-to-end Outage Probability value for the optimal path is minimum and then the optimal path is communicated to the source mobile robot by broadcasting the optimal path through the plurality of Access Points (APs) to establish communication between the source mobile robot and the destination mobile robot.

In yet another aspect, the embodiment herein provides one or more non-transitory machine readable information storage mediums comprising one or more instructions, which when executed by one or more hardware processors perform actions comprises determining an optimal path by a cloud system for establishing a communication between a source mobile robot and a destination robot among a plurality of mobile robots in the multi-hop network in accordance with a subnet information. The subnet information comprises of a network map and a cost map, wherein the subnet information is received from a plurality of Access Points (APs) in the multi-hop network. The determined optimal path defines a multi-hop sequence of Access Points (APs) selected from the plurality of Access Points (APs) to enable the communication between the source mobile robot and the destination mobile robot. Further, the optimal path is determined based on the dynamic path selection model to identify a plurality of paths for communication between the source mobile robot and the destination mobile robot by computing a forward link cost function and a backward link cost function. Here, the forward link cost function is computed for establishing a forward link between the source mobile robot and the destination mobile robot through each Access point (AP) starting from a first Access Point (AP) among the plurality of Access Points (APs) connected to the source mobile robot and a first set of intermediate Access Points (APs) among the plurality of Access Points (APs) that terminate at a second Access Point (AP) connected to the destination mobile robot, wherein the initial value of the forward link cost function at the first Access Point (AP) is set to zero. Then, the backward link cost function is computed for establishing a backward link between the destination mobile robot and the source mobile robot by computing a backward link cost function at each Access Point (AP) starting from the second Access Point (AP) connected to the destination mobile robot and a second set of intermediate Access Points (APs) among the plurality of Access Points (APs) that terminate at the first Access Point (AP) connected to the source mobile robot, wherein the initial value of the backward cost function is set to the computed final forward cost function at the second Access Point (AP). Further, the optimal path is selected for communication between the source mobile robot and the destination mobile robot from the identified plurality of paths comprising the multi-hop sequence of Access Points (APs), wherein an end-to-end forward link cost function and an end-to-end backward link cost function computed for the selected optimal path is minimum, and an end-to-end Outage Probability value for the optimal path is minimum and then the optimal path is communicated to the source mobile robot by broadcasting the optimal path through the plurality of Access Points (APs) to establish communication between the source mobile robot and the destination mobile robot.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
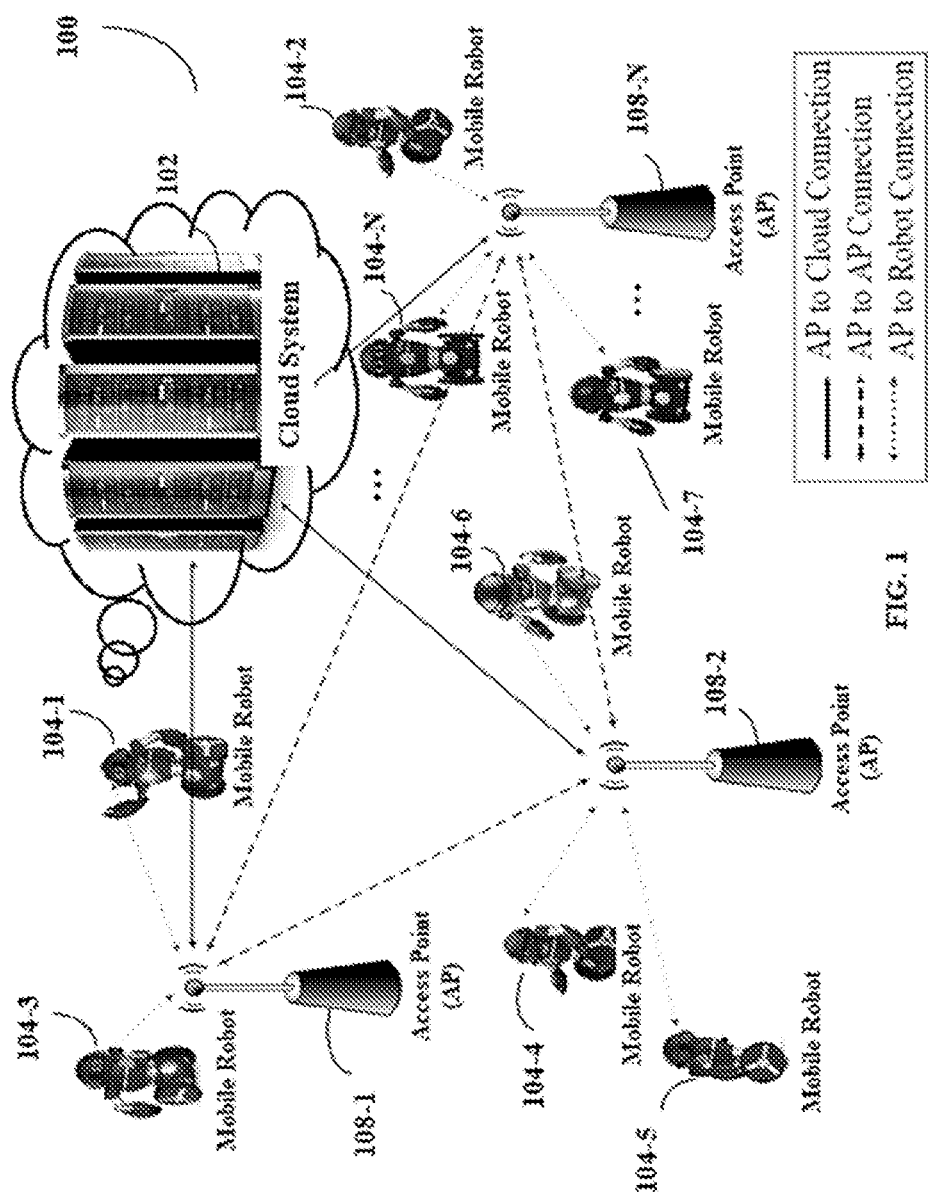
FIG. 1 illustrates an exemplary environment of a cloud system in a multi-hop network, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments herein provide a method and system for multi-hop path selection for mobile robots based on a cloud platform. The system, alternatively referred as cloud system or cloud platform, determines an optimal path for establishing a communication between a source mobile robot and a destination robot among a plurality of mobile robots in the multi-hop network in accordance with a subnet information. The cloud system receives the subnet information from a plurality of Access Points (APs) in the multi-hop network. The subnet information comprises of a network map and a cost map of each Access Points (APs) in the multi-hop network. The network map of each Access Point (AP) provides a list of mobile robots connected to each Access point (AP) and a list of Access Points (APs) connected to each Access point (AP). The cost map includes the plurality of Cost Function (CF) parameters such as the forward link cost function, the backward link cost function and the path loss (PL) value based on which the optimal path is determined based on the dynamic path selection model. Further, the cloud system determines an optimal path to identify a plurality of paths for communication between the source mobile robot and the destination mobile robot by computing a forward link cost function and a backward link cost function at each Access Point (AP) or for each Access Point (AP). The forward link cost function is computed at the cloud system 102 to establish communication (forward link) between the source mobile robot and the destination mobile robot. Then, the backward link cost function is computed at each Access Point (AP) to establish communication (backward link) between the destination mobile robot and the source mobile robot. Further, the cloud system 102 selects an optimal path for communication between the source mobile robot and the destination mobile robot from the identified plurality of paths comprising the multi-hop sequence of Access Points (APs). For the selected optimal path, an end-to-end forward link cost function and an end-to-end backward link cost function computed for the selected optimal path is minimum with a minimum an end-to-end Outage Probability value for the optimal path. The selected optimal path is communicated to the source mobile robot by broadcasting the optimal path through the plurality of Access Points (APs). On receiving the optimal path, the source mobile robot establishes communication with the destination mobile robot in accordance with the multi-hop sequence of Access point (APs) in the received optimal path. Thus, the disclosed cloud system based optimal path selection, utilizes the higher computational capacity of cloud processing to provide time efficient and energy efficient optimal path selection without loading the low energy capacity mobile robots for optimal path computation, which requires higher computation capability and consumes more power. Moreover, since the cloud system is aware of the global network map, the selected path provides the optimal solution. Thus, energy is saved at the mobile robot which improves working life time of the mobile robot.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 illustrates an exemplary environment of a cloud system in a multi-hop network, in accordance with some embodiments of the present disclosure. The exemplary environment 100 includes the cloud system 102, the plurality of Access Points (APs) 108-1 through 108-N and the plurality of mobile robots 104-1 through 104-N deployed in the multi-hop network. The communication between the cloud system 102 and the plurality of mobile robots 104-1 through 104-N is routed through the plurality of Access Points, alternatively referred as (APs) (108-1 through 108-N). The cloud system 102 communicates with at least one mobile robot among the plurality of mobile robots through an Access Point (AP) among the plurality of Access Points (APs) for establishing communication path between the source mobile robot and the destination mobile robot by determines optimal path based on dynamic path selection model. The Access Points (APs) in the multi-hop network stores local topological and task information of each mobile robot among the plurality of mobile robots. Further, each Access Point (AP) among the plurality of Access Points (APs) provides the network map and the cost map of the subnet information to the cloud system 102 through Access point Services (APs). The cloud system 102 is equipped with global knowledge of network to determine an optimal path that improves lifetime of the mobile robots. The cloud system 102 implements a distributed computing architecture where data and program code for cloud-based applications are shared between one or more client devices and/or cloud computing devices on a near real-time basis.

Figure 2:
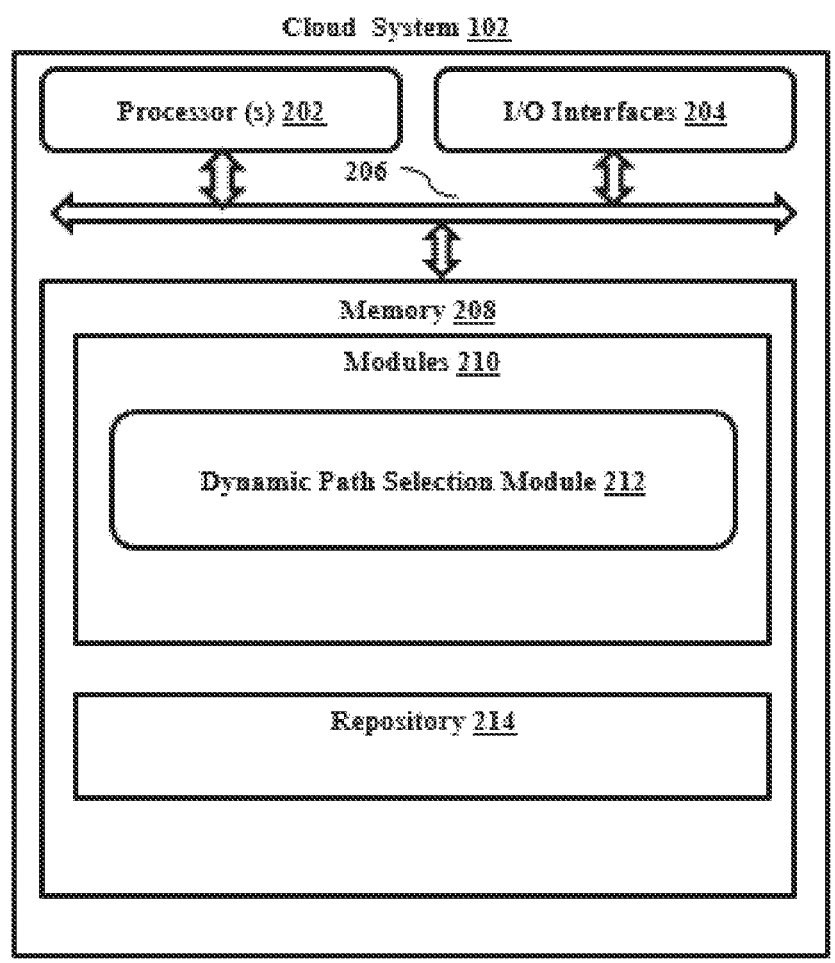
FIG. 2 illustrates a high level functional block diagram of the cloud system in the multi-hop network in conjunction with FIG. 1, in accordance with some embodiments of the present disclosure.

FIG. 2 illustrates a high level functional block diagram of the cloud system in the multi-hop network in conjunction with FIG. 1, in accordance with some embodiments of the present disclosure. The cloud system 102 consists of one or more hardware processors such as a processor(s) 202, at least one memory 208, and an I/O interface 204. The processor 202 (hardware processor), the memory 208, and the I/O interface(s) 204 may be coupled by a system bus 206. The memory 208 further may include modules 210. The hardware processor(s) 202 may be implemented as one or more multi-core processors, a microprocessors, microcomputers, micro-controllers, digital signal processors, central processing units, state machines, logic circuitries, and/or any devices that manipulate data based on operational instructions. Among other capabilities, the hardware processor 202 is configured to fetch and execute computer-readable instructions stored in the memory 208 and communicate with the modules 210, internal or external to the memory 208, for triggering execution of functions to be implemented by the modules 210.

The I/O interface(s) 204 of the cloud system 102 may include a variety of software and hardware interfaces, for example, a web interface, a graphical user interface and the like. For example, interfaces for peripheral device(s), such as a keyboard, a mouse, an external memory and a printer and a display. The I/O interface(s) 204 may enable the cloud system 102 to communicate with other devices, such as the, web servers and external databases. The I/O interface(s) 204 may facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 204 may include one or more ports for connecting a number of computing systems with one another or to another server computer. The I/O interface(s) 204 may include one or more ports for connecting a number of devices to one another or to another server.

The memory 208 may include any computer-readable medium known in the art including, for example, volatile memory, such as static random Access memory (SRAM) and dynamic random Access memory (DRAM), and/or non-volatile memory, such as read only memory (ROM), erasable programmable ROM, flash memories, hard disks, optical disks, and magnetic tapes. Further, the modules 210 may include routines, programs, objects, components, data structures, and so on, which perform particular tasks or implement particular abstract data types. The modules 210 can be an Integrated Circuit (IC), external to the memory 208 (not shown), implemented using a Field-Programmable Gate Array (FPGA) or an Application-Specific Integrated Circuit (ASIC). The names of the modules of functional block within the modules 210 referred herein, are used for explanation and are not a limitation. Further, the memory 208 can also include a repository 214 (internal to the cloud system 102 as shown in FIG. 2). The modules 210 may include computer-readable instructions that supplement applications or functions performed by the cloud system 102. The repository 214 may store data that is processed, received, or generated as a result of the execution of one or more modules in the module(s) 210. The modules 210 of the cloud system 102 includes a dynamic path selection module 212 to determine the optimal path for establishing communication path between the source mobile robot and the destination mobile robot among the plurality of mobile robots in the multi-hop network of the environment 100, in accordance with the subnet information.

Figure 3A:
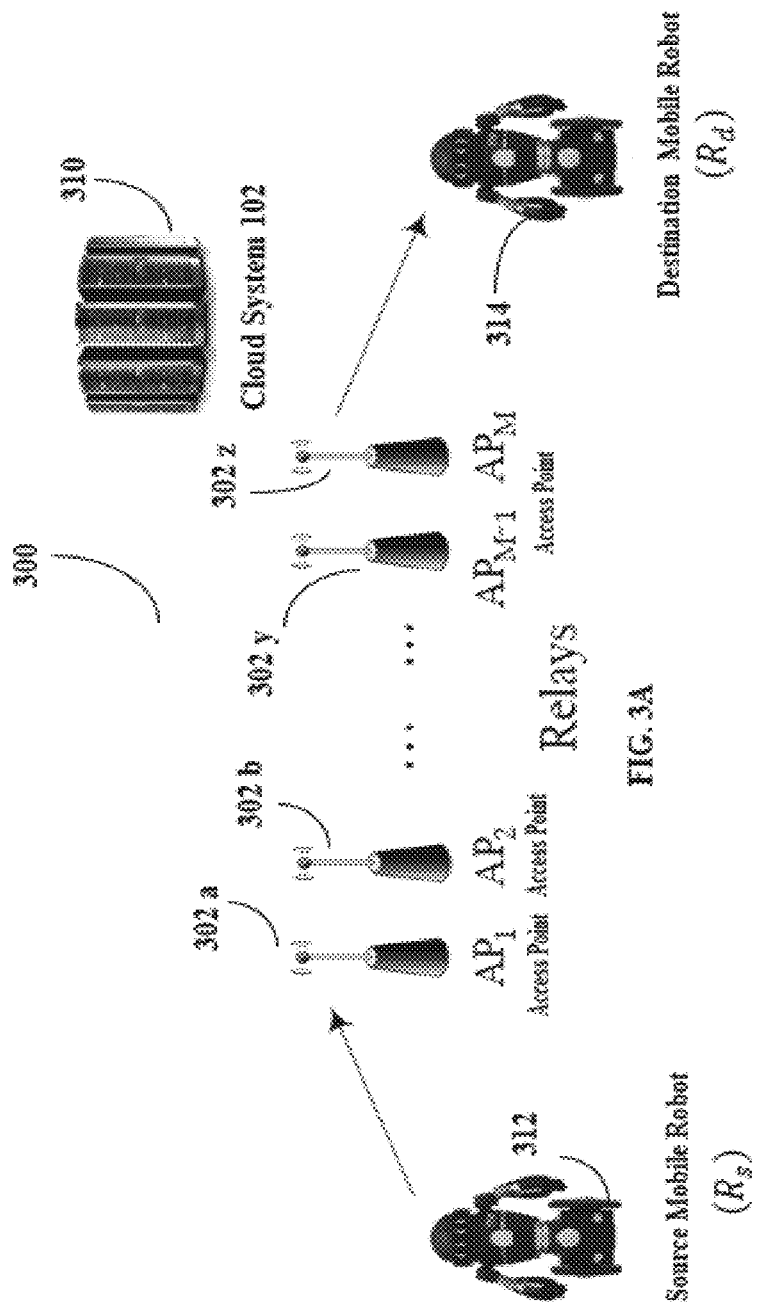
FIG. 3A illustrates an example scenario, where the cloud system determines an optimal path to establish communication path between the source mobile robot and the destination mobile robot through a plurality of Access Points (APs) in the multi-hop network, in accordance with some embodiments of the present disclosure.

FIG. 3A illustrates an example scenario, where the cloud system determines an optimal path to establish communication path between the source mobile robot and the destination mobile robot through a plurality of Access Points (APs) in the multi-hop network, in accordance with some embodiments of the present disclosure. Considering an example indoor network environment 300, which is deployed with a source mobile robot ($R_s$) 312 among the plurality of mobile robots, a destination mobile robot ($R_d$) 314 among the plurality of mobile robots, the plurality of Access Points $AP_1$ 302a through $AP_M$ 302z and the cloud system 102. Each Access Point (AP) among the plurality of Access Points (APs) have the capabilities to obtain the path information of the source mobile robot ($R_s$) 312 that lies within the communication range of that Access Points (APs). The cloud system 102 has the global knowledge of the network topology to determine an optimal path based on the dynamic path selection model for the source mobile robot ($R_s$) 312 to establish the communication path for transmitting the information that reaches the destination mobile robot ($R_d$) 314. The source mobile robot ($R_s$) 312 is connected to the nearby Access Point) 302a and then to the one or more intermediate Access Points (APs) $AP_1$ through ($AP_M$) to reach the destination Access Point ($AP_M$) 302z connected to the destination mobile robot ($R_d$) 314 to create a multi-hop network. Here, the Access Point ($AP_1$) 302a through Access Point ($AP_M$) 302z remains constant for any combination of the relay network, such that the possible combinations of relay is $2^{M-2}$. Representing, X={φ, $X_1$, $X_2$, ... $X_2M-2_{-1}$} as a plurality of relays assists the source mobile robot ($R_s$) 312 to reach the destination mobile robot ($R_d$) 314 through one or more intermediate Access Points (APs). The plurality of Access Points (APs) transmit the plurality of Cost Function (CF) parameters that includes the path loss (PL) value of each mobile robot links connected to the cloud system 102, such that the path loss (PL) values are dynamic for the links between each mobile robot among the plurality of mobile robots to the plurality of mobile robots and the plurality of mobile robots to the plurality of Access Points (APs). Further, the mobile robots continuously transmits beacon signals to detect the plurality of Access Points (APs) to establish the communication link between each mobile robot with an Access Point (AP) within an accessible range of communication. Each mobile robot among the plurality of mobile robots are equipped with the resource directory to assist the source mobile robot ($R_s$) 312 among the plurality of mobile robots to identify an appropriate Access Point (AP) among the plurality of Access Points (APs) to reach the destination mobile robot ($R_d$) 314. The resource directory associated with the mobile robot publishes a list of available Access Points (APs) among the plurality of Access Points (APs) where (i∈M, APs) based on the distance D from the mobile robot $R_k$ where (k∈N,mobile robot). Once the connection between the Access Point (AP) and the mobile robot is established, the Access point (AP) conveys the subnet information to the cloud system 102 through Access Point Services (APs).

Figures 3B, 3C:
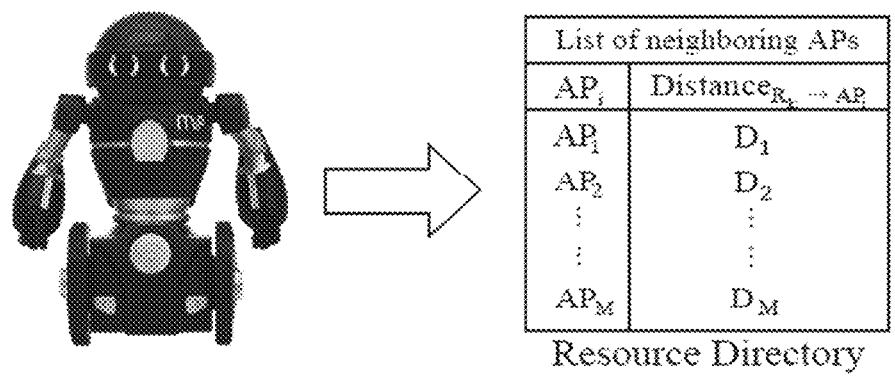
FIG. 3B illustrates an example scenario of resource directory associated with each mobile robot to obtain a list of available Access Points (APs), in conjunction with FIG. 1 and FIG. 2, in accordance with some embodiments of the present disclosure.
FIG. 3C illustrates an example scenario of obtaining subnet information of each available Access Points (APs) in the multi-hop network in conjunction with FIG. 1 and FIG. 2, in accordance with some embodiments of the present disclosure.
Figure 4:
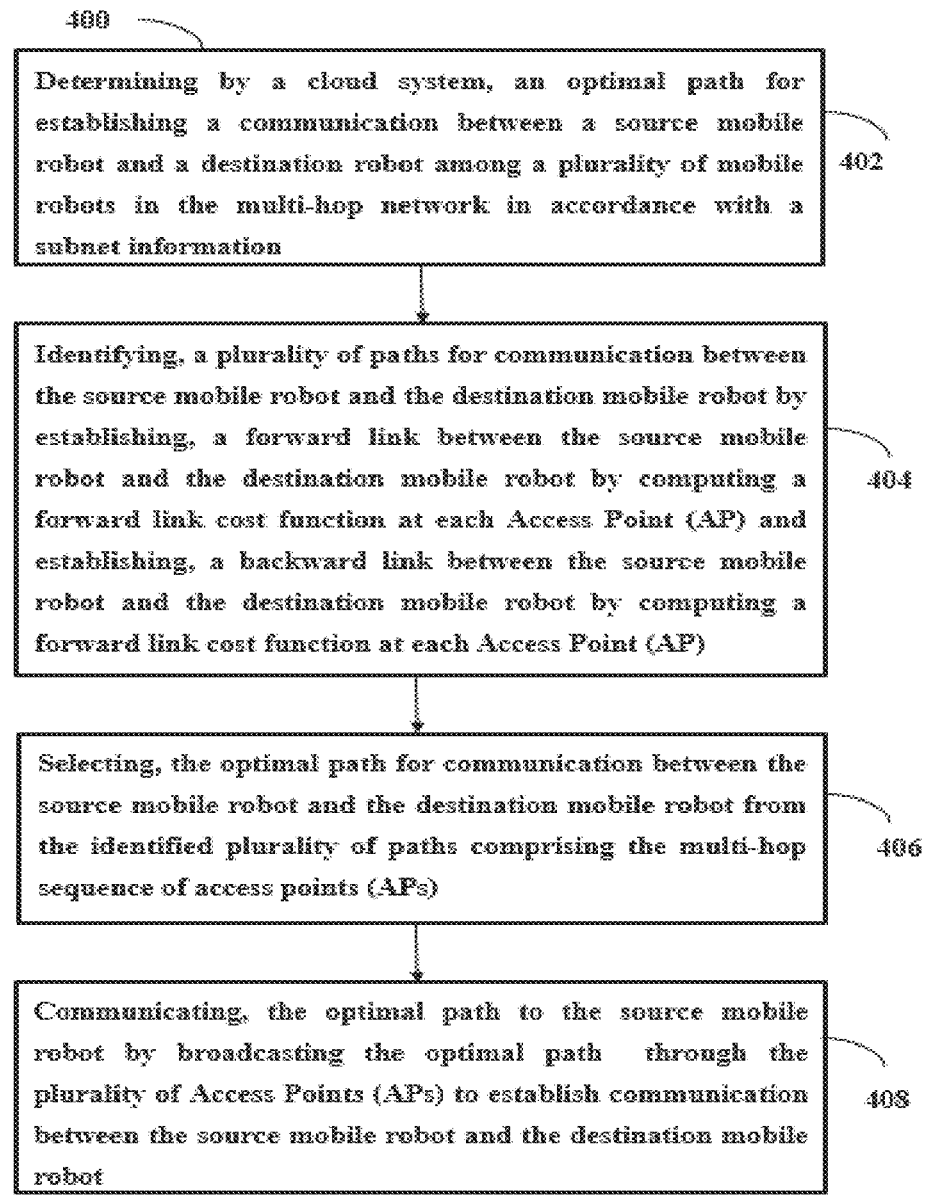
FIG. 4 is a flow diagram depicting a method with steps utilized by the cloud system to determine an optimal path to establish communication path between the source mobile robot and the destination mobile robot in the multi-hop network, in accordance with some embodiments of the present disclosure.

FIG. 4 is a flow diagram depicting a method with steps utilized by the cloud system to determine an optimal path to establish a communication path between the source mobile robot 312 and the destination mobile robot in the multi-hop network, in accordance with some embodiments of the present disclosure. The method 400 is explained in with example scenario of FIG. 3A in conjunction with FIG. 3B and FIG. 3C. At step 402, the method 400 includes allowing the cloud system 102 to determine an optimal path by one or more processors of the cloud system 102, wherein the determined optimal path is utilized for establishing a communication between the source mobile robot ($R_s$) 312 and the destination mobile robot ($R_d$) 314 among the plurality of mobile robots in the multi-hop network in accordance with the subnet information. The subnet information comprises the network map and the cost map, wherein the subnet information is received from a plurality of Access Points (APs) in the multi-hop network, and wherein the determined optimal path defines a multi-hop sequence of Access Points (APs), selected from the plurality of Access Points (APs) to enable the communication between the source mobile robot ($R_s$) 312 and the destination mobile robot ($R_d$) 314. The robots are assumed to be mobile, whereas the Access Points (APs) are static. In the deployment region of the multi-hop network, the mobile robots continuously transmit beacon signals to detect the plurality of Access Points (APs) to establish the communication link between each mobile robot with an Access Point (AP) within an accessible range of communication. Each mobile robot among the plurality of mobile robots are equipped with the resource directory to assist the source mobile robot ($R_s$) 312 among the plurality of mobile robots to identify an appropriate Access Point (AP) among the plurality of Access Points (APs) to reach the destination mobile robot ($R_d$) 314. The resource directory associated with the mobile robot publishes a list of available Access Points (APs) among the plurality of Access Points (APs) where (i∈M, APs) based on the distance D from the mobile robot $R_k$ where (k∈N,mobile robot). Once the connection between the Access Point (AP) and the mobile robot is established, the Access point (AP) conveys the subnet information to the cloud system 102 through Access Point Services (APs).

The subnet information includes the network map and the cost map representing connections between each Access Point (AP) and each mobile robot and connections between each Access Point (AP) to Access Point (AP). The network map of the subnet information includes 'N' total number of mobile robots and 'M' total number of Access Points (APs) connected to the corresponding Access Point (AP) to provide the IP address information of the multi-hop network. The network map of the subnet information provides a list of 'N' number of mobile robots connected to the Access Point ($AP_i$) and a list of 'M' number of Access Points (APs) connected to ($AP_i$). Further, the cost map of the subnet information includes the plurality of Cost Function (CF) parameters such as the forward link cost function, the backward link cost function and the path loss (PL) value based on which the optimal path is determined based on the dynamic path selection model. The Cost Function (CF) parameters includes delay, jitter, path loss (PL) value and thereof for determining an optimal path. However, the path loss (PL) value of the Cost Function parameter (CF) is utilized to compute an optimal path between the source mobile robot ($R_s$) 312 and the destination mobile robot ($R_d$) 314 through the multi-hop Access Points (APs). Considering k=s for source location and k=d as destination location.

At step 404, the method 400 includes allowing the cloud system 102 to determine the optimal path by identifying, a plurality of paths for communication between the source mobile robot ($R_s$) 312 and the destination mobile robot by establishing, a forward link between the source mobile robot ($R_s$) 312 and the destination mobile robot ($R_d$) 314 by computing a forward link cost function at each Access Point (AP) and establishing, a backward link between the destination mobile robot ($R_d$) 314 and the source mobile robot ($R_s$) 312 by computing a backward link cost function at each Access Point (AP). Considering the example as illustrated in the FIGS. 3A, 3B and 3C are considered where, p be the transmitted signal from source mobile robot ($R_s$),
q be the interference signal,
$P_{TR_s}$ be the transmitted power for source mobile robot ($R_s$) and
$P_I$ be the power of interfering signal.

Considering all the above parameters, where the received power at each Access Point ($AP_i$) is given below by Equation 1, $$P_{R_s-AP_i} = h_{R_s-AP_i}\sqrt{P_{TR_s}}p + h_{I-AP_i}\sqrt{P_I}q + nAP_i \qquad \text{Equation 1}$$

Where, $h_{R_s-AP_i}$ represents the fading co-efficient of channel from the source mobile robot ($R_s$) 312 to the plurality of Access Points $AP_i$, $h_{I-AP_i}$ is the fading co-efficient of channel from source point to interfering signal of the corresponding $AP_i$ and $nAP_i$ representing the additive white Gaussian noise at each $AP_i$. Based on Equation 1, the received power is computed for the destination mobile robot ($R_d$) 314 given by $P_{AP_i-R_d}$ from Access Point ($AP_i$) as source Access Points (APs) transmitting the Cost Function (CF) parameters to the cloud system 102. Similarly, multiple links are established among the mobile robots to the mobile robots and the mobile robots to the Access Points (APs). The dynamic path selection module 212 of the cloud system 102 determines the optimal path based on dynamic path selection model using the plurality of Cost Function (CF) parameters. The plurality of Cost Function (CF) parameters includes the forward link cost function (F) the backward link cost function (G) and the path loss value (PL). The forward link cost function $F_j$ of $j_{th}$ mobile robot or AP is defined as the summation of link cost function of the previous hop of $i_{th}$ mobile robot or AP and the path loss value $PL_{ij}$ between the $i_{th}$ mobile robot or AP and $j_{th}$ mobile robot or AP. The backward link cost function $G_j$ of $j_{th}$ mobile robot or AP is defined as the difference between the link cost function of the previous hop of $i_{th}$ mobile robot or Access Point (AP) and the path loss value $PL_{ij}$ between the $i_{th}$ mobile robot or AP and $j_{th}$ mobile robot or AP. The Access Points (APs) have equal values of the forward link cost function (F) and the backward link cost function (G) for determining an optimal path using dynamic path selection model. The source mobile robot ($R_s$) 312 receives the optimal path information and it connects to the nearby Access Point (AP) and further connects to one or more intermediate Access Points (APs) to create the multi-hop network to reach the destination mobile robot ($R_d$) 314.

In an embodiment, the forward link between the source mobile robot ($R_s$) 312 and the destination mobile robot ($R_d$) 314 is established by computing the forward link cost function at each Access Point (AP) starting from a first Access Point (AP) among the plurality of Access Points (APs) connected to the source mobile robot ($R_s$) 312 and a first set of intermediate Access Points (APs) among the plurality of Access Points (APs) that terminate at a second Access Point (AP) connected to the destination mobile robot ($R_d$) 314, wherein the initial value of the forward link cost function at the first Access Point (AP) is set to zero. The network map associated with of each Access Point (AP) provides a list of mobile robots connected to each Access Point (AP) and a list of Access Points (APs) connected to each Access Point (AP).

In an embodiment, the backward link between the destination mobile robot ($R_d$) 314 and the source mobile robot ($R_s$) 312 is established by computing the backward link cost function at each Access Point (AP) starting from the second Access Point (AP) connected to the destination mobile robot ($R_d$) 314 and a second set of intermediate Access Points (APs) among the plurality of Access Points (APs) that terminate at the first Access Point (AP) connected to the source mobile robot ($R_s$) 312, wherein the initial value of the backward cost function is set to the computed final forward cost function at the second Access Point (AP).

In an embodiment, determining the optimal path based on dynamic path selection model further elaborates the following steps, Requirements: Declaring a plurality Cost Function (CF) parameters that includes a forward link cost function (F), backward link cost function (G) and path loss (PL)
Returns: Path selected from the source mobile robot ($R_s$) 312 to the destination mobile robot ($R_d$) 314 through multi-hop Access Points (APs)
Step 1: Start
Step 2: Declare forward link cost function parameter value $F_i$, where i represents Access Point (AP) number for {i∈M}, path loss $PL_{ij}$ for the link from Access Point ($AP_i$) to the next hop ($AP_j$)

Step 3: Declare backward link cost function parameter value $G_j$ where j represents Access Point (AP) number for {j∈M} and j≠i, path loss $PL_{ji}$ for link from Access Point $AP_j$ to the next backward hop $AP_i$ Step 4: Initialize $F_i$=0, where i=1

Step 5: Compute $F_j=F_i+PL_{ij}$

Step 6: If two or more than two $i_{th}$ Access Points (APs) merge to the same $j_{th}$ Access Point (AP), compute $F_j=\min\{F_i+PL_{ij}\}$ Step 7: If $F_j$ reaches to the Access Point ($AP_j$) connected to the destination mobile robot $R_d$, forward link is established Step 8: Initialize $G_j=F_j$ Step 9: Compute $G_i=G_j-PL_{ji}$ Step 10: If two or more than two $j_{th}$ Access Points (APs) merge to the same $i_{th}$ Access Point (AP), compute $G_i=\max\{G_j-PL_{ji}\}$ Step 11: If $G_i$ reaches to the Access Point $AP_i$ connected to $R_s$, backward link is established Step 12: If $G_i=F_j$ for all hops, optimal path is selected Step 13: Stop Now referring to FIG. 3A as use case scenario for determining the optimal path based on dynamic path selection model in an indoor environment, considering that the source mobile robot ($R_s$) 312 establishes communication to the Access Points (APs) to reach to the destination mobile robot ($R_d$) 314. The computation begins at each Access Point $AP_i$ where, i=1 connected to the source mobile robot ($R_s$) 312 which needs to reach Access Point $AP_j$ where j=M connected to the destination mobile robot ($R_d$) 314 using the forward link cost function parameter value $F_i$ through multi-hop Access Points (APs) as declared in Step 2. Similarly, in Step 3, the Access Point $AP_j$ is connected to the destination mobile robot ($R_d$) 314 to communicate with $AP_i$ to reach the source mobile robot ($R_s$) 312 using the backward link cost function parameter value $G_j$. Initially $F_i$ is set to zero where, i represents the first nearby Access Point connected to the source mobile robot ($R_s$) 312 as mentioned in Step 4. Further, the forward link cost function parameter $F_j$ is computed for the next hop Access Points (APs) represented by $F_j=F_i+PL_{ij}$ (such as the summation of $F_i$ from previous hop AP and the path loss value of previous hop $AP_i$ to the next hop of $AP_j$) as represented in Step 5. If two or more than two $i_{th}$ Access Points (APs) merge to the same $j_{th}$ Access Point (AP), the minimum forward link cost function parameter as $F_j=\min\{F_i+PL_{ij}\}$ is computed as given in Step 6. In Step 7, if $F_j$ reaches to the $AP_j$ connected to the destination mobile robot ($R_d$) 314, the forward link is established. Similarly to form a closed loop multi-hop network, the $AP_j$ is connected to the destination mobile robot ($R_d$) 314 which establishes a connection to the Access Point $AP_i$ to reach the source mobile robot ($R_s$) 312. Further, the backward link cost function parameter value G initializes $G_j=F_j$ as given in Step 8. Further $G_j=G_j-PL_{ji}$ is computed as given in Step 9. In Step 10, if two or more than two $j_{th}$ Access Points (APs) merge to the same $i_{th}$ Access Point (AP), the maximum backward link cost function parameter is computed $G_i=\max\{G_j-PL_{ji}\}$. If $G_i$ reaches to the $AP_i$ connected to source mobile robot ($R_s$) 312, the backward link is established as given in Step 11. Finally in Step 12, the Access Points (APs) with equal value of $G_i=F_j$ form an optimal path to establish the connection between the source mobile robot ($R_s$) 312 to the destination mobile robot ($R_d$) 314 through multiple Access Points (APs). However, the optimal path determined based on the dynamic path selection model with similar values of forward link cost function (F) and backward link cost function (G) at each hop offers least path loss value and considered as an optimal path in the multi-hop network.

At step 406, the method 400 includes allowing the cloud system 102 to select the optimal path for communication between the source mobile robot ($R_s$) 312 and the destination mobile robot ($R_d$) 314 from the identified plurality of paths comprising the multi-hop sequence of Access Points (APs), wherein an end-to-end forward link cost function and an end-to-end backward link cost function computed for the selected optimal path is minimum, and an end-to-end Outage Probability value for the optimal path is minimum. In an embodiment, the outage probability is computed to evaluate the performance of the determined optimal path based on dynamic path selection model to establish the communication path between the source mobile robot ($R_s$) 312 and the destination mobile robot ($R_d$) 314. For the deployment scenario, Network Simulator-3 (NS-3) is utilized where a plurality of nine stationary Access Points (APs) are deployed at a distance of 200 meters apart. In the deployment region, a pair of mobile robots includes the source mobile robot ($R_s$) 312 is selected to establish a connection to a remote destination mobile robot ($R_d$) 314. These pair of mobile robots are installed with Constant Velocity mobility model that helps the source mobile robot ($R_s$) 312 and the destination mobile robot ($R_d$) 314 to move with a constant velocity of 5 meters/second. In NS-3, Constant Velocity is considered as a three-dimensional vector which sets the motion of the mobile robot in a particular direction with the velocity. Use of wireless network technology such as IEEE 802.11b Wi-Fi (Wireless Fidelity) with an indoor range of 300 meters helps the deployed entities to communicate over the wireless network. The frequency band through which the data is transmitted is considered as unoccupied. To establish the communication path between the source mobile robot ($R_s$) 312 and the destination mobile robot ($R_d$) 314 creates a multi-hop relay network of Access Points (APs) in the deployment scenario. The cloud system 102 based dynamic path selection model computes an optimal path that established a communication path for the source mobile robot ($R_s$) 312 to reach the destination mobile robot ($R_d$) 314 through one or more intermediate Access Points (APs). The determined optimal path based on dynamic path selection model is validated by obtaining the path loss values as Cost Function (CF) parameters of each channel in the network over a regular interval of time. The Cost Function (CF) parameters is a closed loop function defined by the forward link cost function (F) parameter and the backward link cost function (G) parameter.

In an embodiment, the above illustrated example from FIGS. 3A, 3B and 3C, where the source mobile robot ($R_s$) 312 reaches to the destination mobile robot ($R_d$) 314 through one or more Access Points (APs). The outage probability is defined as the probability where the destination mobile robot ($R_d$) 314 fails to receive the transmitted signal broadcast from the source mobile robot ($R_s$) 312. The outage probability is represented as mentioned below in Equation 2, $$Pr_{out}=Pr(\text{outage}|X=\varphi)*Pr(X=\varphi)+Pr(\text{outage}|X=X_a)*Pr(X=X_a) \quad \text{Equation 2}$$

The channel capacity for the source mobile robot ($R_s$) 312 to the Access Point (AP) is obtained based on the equation 2 and is represented as mentioned below in Equation 3, $$C_{R_s-AP_i} = \frac{1}{Z-1}\log2\left(1 + \frac{|h_{R_s-AP_i}|^2 \chi R_s}{1+|h_{I-AP_i}|^2 \chi I}\right) \text{ Where,} \quad \text{Equation 3}$$

$$\chi R_s = \frac{P_{TR_s}}{SD} \text{ and } \chi I = \frac{P_I}{SD},$$

where, SD represents the power spectrum density of noise and Z represents the number of mobile robots or the number of Access Points which form the optimal path. In the deployment scenario, the number of hops (Z−1) is considered in the selected path. The outage probability occurs only when the channel capacity falls below the required Data Date (DR). The occurrence of outage probability is given by Equation 4, $$\frac{1}{Z-1}\log2\left(1 + \frac{|h_{R_s-AP_i}|^2 \chi R_s}{1+|h_{I-AP_i}|^2 \chi I}\right) < DR \quad \text{Equation 4}$$

$$|h_{R_s-AP_i}|^2 - |h_{I-AP_i}|^2 \chi I \zeta < \zeta \text{ where,}$$

$$\zeta = \left(\frac{2^{(Z-1)*DR}-1}{\chi R_s}\right)$$

Now using the equation 4, the outage probability expressed in Equation 2 is re-framed as $$Pr_{out} = Pr(|h_{R_s-R_d}|^2 - |h_{I-R_d}|^2 \chi I \zeta < \quad \text{Equation 5}$$

$$\zeta(X=\phi)*Pr(X=\phi) + \sum_{b=1}^{Z-1} Pr(|h_{b-(b+1)}|^2 - |h_{I-(b+1)}|^2 \chi I \zeta < \zeta|(X=X_a)*P_r(X=X_a)$$

where, $|h_{R_s-R_d}|^2$, $|h_{b-(b+1)}|^2$, $|h_{I-R_d}|^2$ and $|h_{I-(b+1)}|^2$ follow the exponential distribution with parameter $$\frac{1}{\sigma^2_{R_s-R_d}}, \frac{1}{\sigma^2_{b-(b+1)}}, \frac{1}{\sigma^2_{I-R_d}} \text{ and } \frac{1}{\sigma^2_{I-(b+1)}}$$

respectively.
The $$\frac{1}{\sigma^2_{R_s-R_d}}, \frac{1}{\sigma^2_{b-(b+1)}}, \frac{1}{\sigma^2_{I-R_d}}, \frac{1}{\sigma^2_{I-(b+1)}}$$

represent the fading variance of the $R_s-R_d$, b−(b+1), I−$R_d$ and I−(b+1) channel respectively. Further, the Equation 5 is analyzed independently as given below to generate equations 6, 7, 8 and 9, Equation 6 is generated as mentioned below, $$Pr(|h_{R_s-R_d}|^2 - |h_{I-R_d}|^2 \chi I \zeta < \zeta(X=\phi)= \quad \text{Equation 6}$$

$$1 - \frac{(Z-1)\sigma^2_{R_s-R_d}}{(Z-1)\sigma^2_{R_s-R_d}+\sigma^2_{I-R_d}\chi I \zeta}*\exp\left(-\frac{\zeta}{(Z-1)\sigma^2_{R_s-R_d}}\right)$$

Equation 7 is generated as mentioned below, $$Pr(X=\phi) = \prod_{i=1}^{M}\left(1 - \frac{\sigma^2_{R_s-AP_i}}{\sigma^2_{R_s-AP_i}+\sigma^2_{I-AP_i}\chi I \zeta}*\exp\left(\frac{-\zeta}{\sigma_{R_s-AP_i}}\right)\right) \quad \text{Equation 7}$$

Equation 8 is generated as mentioned below, $$Pr(|h_{b-(b+1)}|^2 - |h_{I-(b+1)}|^2 \chi I \zeta < \zeta(X=X_a) = \quad \text{Equation 8}$$

$$1 - \frac{\sigma^2_{b-(b+1)}}{\sigma^2_{b-(b+1)}+\sigma^2_{I-(b+1)}\chi I \zeta}*\exp\left(\frac{-\zeta}{\sigma^2_{b-(b+1)}}\right)$$

and
Equation 9 is generated as mentioned below, $$Pr(X=X_a) = \frac{CF_{X_a}}{\sum_{a=1}^{2^{(M-2)}-1} CFX_a} \quad \text{Equation 9}$$

In Equation 9, CF is the cost function parameter. The closed form expression for the outage probability is obtained by putting equations 6, 7, 8 and 9 in equation 5 given by, $$Pr_{out} = \quad \text{Equation 10}$$

$$\left(1 - \frac{(Z-1)\sigma^2_{R_s-R_d}}{(Z-1)\sigma^2_{R_s-R_d}+\sigma^2_{I-R_d}\chi I \zeta}*\exp\left(\frac{-\zeta}{(Z-1)\sigma^2_{R_s-R_d}}\right)\right)*$$

$$\prod_{i=1}^{M}\left(1 - \frac{\sigma^2_{R_s-AP_i}}{\sigma^2_{R_s-AP_i}+\sigma^2_{I-AP_i}\chi I \zeta}*\exp\left(\frac{-\zeta}{\sigma_{R_s-AP_i}}\right)\right) +$$

$$\sum_{b=1}^{Z-1} 1 - \frac{\sigma^2_{b-(b+1)}}{\sigma^2_{b-(b+1)}+\sigma^2_{I-(b+1)}\chi I \zeta}*$$

$$\exp\left(\frac{-\zeta}{\sigma^2_{b-(b+1)}}\right)*\frac{CF_{X_a}}{\sum_{a=1}^{2^{(M-2)}-1} CFX_a}$$

In Equation 10, the outage probability is computed for the multi-hop network to evaluate the performance of the determined optimal path based on dynamic path selection model. $CF_{X_a}$ is the Cost Function (CF) parameter computed for all possible a=1, 2 . . . $2^{(M-2)}$−1 paths. In the dynamic path selection model, the Cost Function (CF) parameters comprises the forward link cost function (F) parameter, the backward link cost function (G) parameter and the path loss value (PL). At each Access Point ($AP_i$), the Cost function (CF) values for both F and G are computed. The Access Points (APs) with an equal value forward link cost function (F) parameter and the backward link cost function (G) parameter combines to form an optimal navigable path for the source mobile robot ($R_s$) 312 to reach the destination mobile robot ($R_d$) 314. Moreover, an optimal path has an lower value of the outage probability, such that the destination mobile robot ($R_d$) 314 fails to receive the transmitted signal broadcasted through the selected navigable path. Hence, lower the value of the outage probability for the selected optimal path, better the reliability performance of the model.

In an embodiment, selecting optimal path in the multi-hop network computes the cost function CF such that F=G at each hop i and the value of $Pr_{out}$ computed for the possible relays, $X_a=\{\varphi, X_1, X_2, \ldots X_2M-2_1\}$ is the minimum.

$$\text{Considering, } \vartheta = \frac{(Z-1)\sigma^2_{R_s-R_d}}{(Z-1)\sigma^2_{R_s-R_d} + \sigma^2_{I-R_d}\chi l\zeta} * \exp\left(\frac{-\zeta}{(Z-1)\sigma_{R_s-R_d}}\right) *$$

$$\prod_{i=1}^{M}\left(1 - \frac{\sigma^2_{R_s-AP_i}}{\sigma^2_{R_s-AP_i} + \sigma^2_{I-AP_i}\chi l\zeta} * \exp\left(\frac{-\zeta}{\sigma_{R_s-AP_i}}\right)\right)$$

and representing the second component $$\varphi = \sum_{b=1}^{Z-1} 1 - \frac{\sigma^2_{b-(b+1)}}{\sigma^2_{b-(b+1)} + \sigma^2_{I-(b+1)}\chi l\zeta} * \exp\left(\frac{-\zeta}{\sigma^2_{b-(b+1)}}\right)$$

and representing equation 10 as mentioned below.

$$CF_{XA} = \frac{Pr_{out} + \vartheta - 1}{\varphi} \sum_{a=1}^{2^{(M-2)}-1} CF_{X_a} \quad \text{Equation 11}$$

As mentioned in Equation 11, $CF_{XA}$ is the Cost Function parameter computed for the end-to-end paths selected in the multi-hop network. $CF_{X_a}$ is the cost function parameter computed for all possible paths available in the multi-hop network. Further $\vartheta$ and $\varphi$ consists of data rate, path loss value, forward link cost function (F) and backward link cost function (G). To validate the equation 11, the following necessary conditions need to be satisfied:
1. We represent $CF_{Xa}$ such that $CF_{Xa\alpha=\{F=G\}}$ then if $\alpha=\{F=G\}$ for all hops, the optimal path from the source mobile robot ($R_s$) 312 to the destination mobile robot ($R_d$) 314 is identified.
2. If $\alpha=\{F\neq G\}$ for all hops, with selected optimal path, better signal strength for end-to-end communication is achieved with lower outage probability.

At step 408, the method 400 includes allowing the cloud system 102 to communicate, the optimal path to the source mobile robot by broadcasting the optimal path through the plurality of Access Points (APs) to establish communication between the source mobile robot and the destination mobile robot.

Figure 5A:
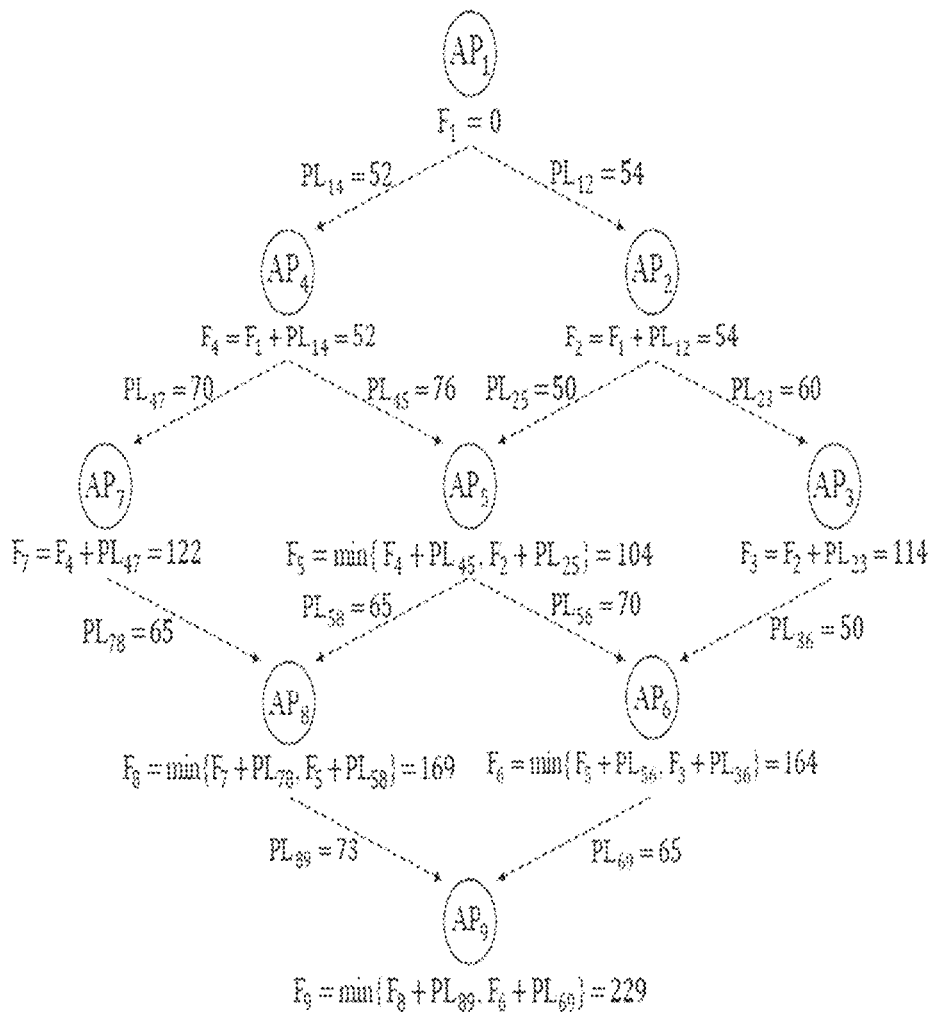
FIG. 5A illustrates an example to compute the forward link cost function in the multi-hop network, in conjunction with FIG. 1 and FIG. 2, in accordance with some embodiments of the present disclosure.
Figure 5B:
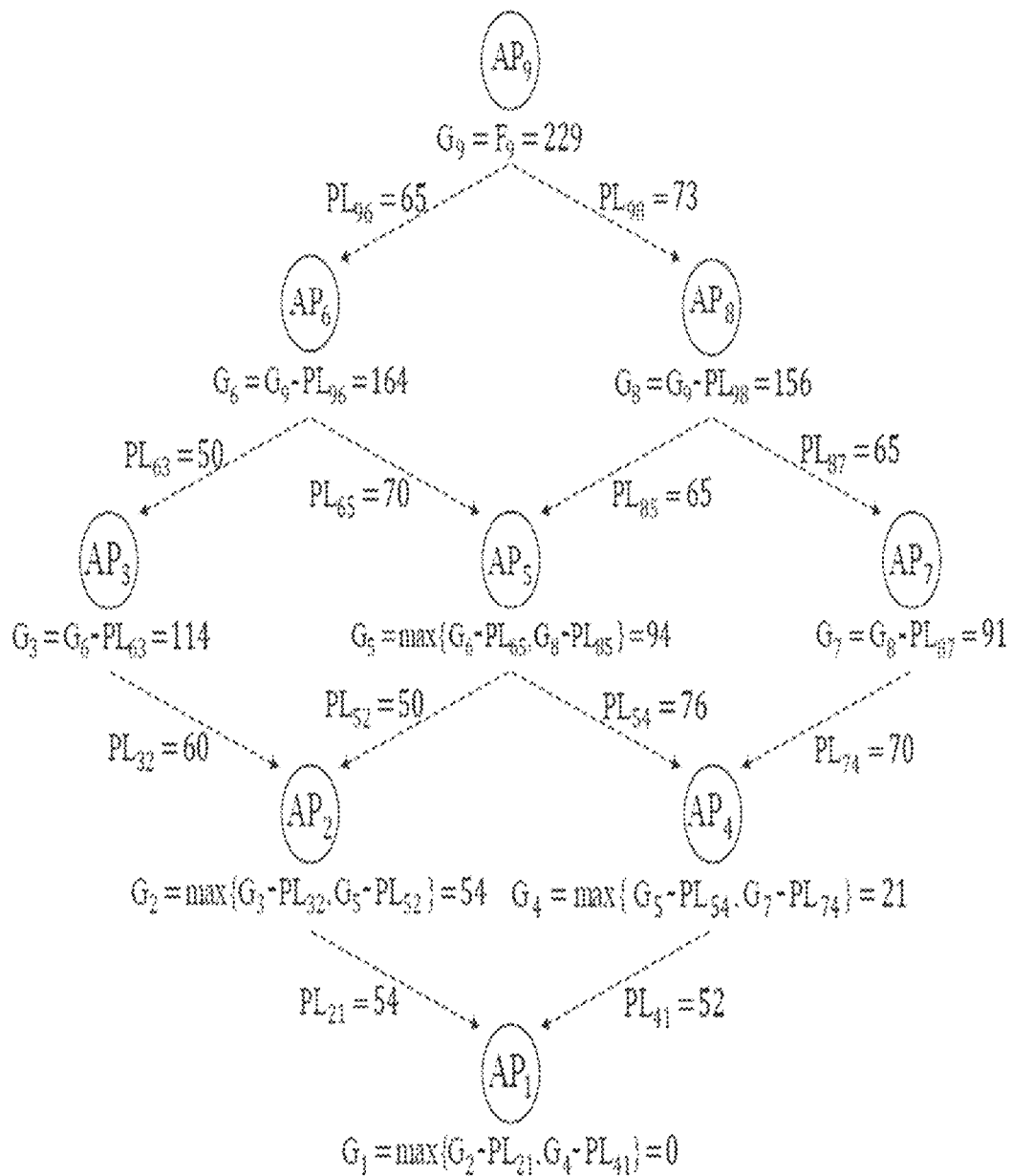
FIG. 5B illustrates an example to compute the backward link cost function in the multi-hop network, in conjunction with FIG. 1 and FIG. 2, in accordance with some embodiments of the present disclosure.

FIG. 5A illustrates an example to compute the forward link cost function in the multi-hop network, in conjunction with FIG. 1 and FIG. 2, in accordance with some embodiments of the present disclosure and FIG. 5B illustrates an example to compute a backward link cost function in the multi-hop network, in conjunction with FIG. 1 and FIG. 2, in accordance with some embodiments of the present disclosure. The multi-hop network of Access Points (APs) for which the source mobile robot ($R_s$) 312 is connected to the Access Point $AP_1$ and the destination mobile robot ($R_d$) 314 is connected to the Access Point $AP_9$. The forward link cost function (F) is computed in the multi-hop network for each hop from $AP_1$ through $AP_9$ which is measured in dBm. To establish the multi-hop network, the source mobile robot $R_s$ 312 is connected to the Access Point ($AP_1$) and the destination mobie robot ($R_d$) 314 is connected to the destination Access Point $AP_9$. The backward link cost function (G) is computed for each Access Point (AP) in the multi-hop network for each hop from $AP_9$ through $AP_1$ which is measured in dBm by subtracting the path loss (PL) value from the previous Cost Function (CF) parameter. The Access Points (APs) $i_{th}$ equal value of forward link cost function (F) and the backward link cost function (G) combines to form an optimal path between the source mobile robot $R_s$ and the destination mobile robot ($R_d$) 314.

TABLE 1

Cost function parameters for possible paths

| Possible Path | Combination of Access Points (APs) from possible paths | | | | | CF Parameter (in dBm) |
|---|---|---|---|---|---|---|
| 1 | $AP_1$ F = 0 G = 0 | $AP_2$ F = 54 G = 54 | $AP_3$ F = 114 G = 114 | $AP_6$ F = 164 G = 164 | $AP_9$ F = 229 G = 229 | 229 |
| 2 | $AP_1$ F = 0 G = 0 | $AP_2$ F = 54 G = 54 | $AP_5$ F = 104 G = 94 | $AP_6$ F = 164 G = 164 | $AP_9$ F = 229 G = 229 | 239 |
| 3 | $AP_1$ F = 0 G = 0 | $AP_2$ F = 54 G = 54 | $AP_5$ F = 104 G = 94 | $AP_8$ F = 169 G = 156 | $AP_9$ F = 229 G = 229 | 242 |
| 4 | $AP_1$ F = 0 G = 0 | $AP_4$ F = 52 G = 21 | $AP_5$ F = 104 G = 94 | $AP_6$ F = 164 G = 164 | $AP_9$ F = 229 G = 229 | 263 |
| 5 | $AP_1$ F = 0 G = 0 | $AP_4$ F = 52 G = 21 | $AP_5$ F = 104 G = 94 | $AP_8$ F = 169 G = 156 | $AP_9$ F = 229 G = 229 | 266 |
| 6 | $AP_1$ F = 0 G = 0 | $AP_4$ F = 52 G = 21 | $AP_7$ F = 122 G = 91 | $AP_8$ F = 169 G = 156 | $AP_9$ F = 229 G = 229 | 260 |

Table.1 depicts all the possible paths by which the source mobile robot ($R_s$) 312 can reach to the destination mobile robot ($R_d$) 314 through Access Points $AP_1$ through $AP_9$. The table.1 shows path information by combining equal values of forward link cost function (F) and backward link cost function (G), (Path-1) which have the least possible cost function parameter (CF) among all the possible paths. This model selects Path-1 to establish communication between the source mobile robot ($R_s$) 312 and the destination mobile robot ($R_d$).314.

In an embodiment, the effectiveness of the proposed cloud system based dynamic path selection model can be demonstrated as the mobile robot associated and associated Access Points (APs) change their different positions over different interval of time represented in Table. 2 that depicts the optimal path selection among the Access Points (APs) over such interval of time. The dynamic path selection model for the source mobile robot ($R_s$) 312 to the destination mobile robot ($R_d$) 314 through one or multiple Access Points (APs) is captured at interval T. The captured mobility pattern of the source mobile robot ($R_s$) 312 and the destination mobile robot ($R_d$) 314 is connected to different Access Points (APs) at time interval $T_1$, $T_2$, $T_3$, $T_4$ and $T_5$ as shown below in the Table 2. The different Access Points (APs) are selected to establish paths between the source mobile robot ($R_s$) 312 to the destination mobile robot ($R_d$) 314 at different time intervals $T_1$, $T_2$, $T_3$, $T_4$ and $T_5$ where, the path loss value and the outage probabilities are computed for both dynamic path selection model and Path Selection using an Instantaneous Signal to Noise Ratio (PS-ISNR) method. At time intervals $T_2$ and $T_5$, the path loss value for both dynamic path selection model and PS-ISNR method are similar as the paths selected from the source mobile robot ($R_s$) 312 to the destination mobile robot ($R_d$) 314 obtain the same navigable paths follow the same route. At $T_2$ and $T_5$, the outage probabilities are similar for both dynamic path selection model and the PS-ISNR method.

TABLE 2

Path selection procedure by capturing mobility pattern

| Time | $R_s$ connected | $R_d$ connected | Combination of Access Points (APs) from a path | | Path loss (PL) value in dBm | | Outage Probability | |
|---|---|---|---|---|---|---|---|---|
| | | | Dynamic path selection model | PS-ISNR method | Dynamic path selection | PS-ISNR method | Dynamic path selection model | PS-ISNR method |
| $T_1$ | $AP_1$ | $AP_9$ | $AP_1 - AP_2 - AP_3 - AP_6 - AP_9$ | $AP_1 - AP_4 - AP_7 - AP_8 - AP_9$ | 229 | 260 | 0.0867 | 0.0977 |
| $T_2$ | $AP_2$ | $AP_8$ | $AP_2 - AP_5 - AP_8$ | $AP_2 - AP_5 - AP_8$ | 115 | 115 | $3.7654 \times 10^{-4}$ | $3.7654 \times 10^{-4}$ |
| $T_3$ | $AP_3$ | $AP_7$ | $AP_3 - AP_2 - AP_1 - AP_4 - AP_7$ | $AP_3 - AP_6 - AP_9 - AP_8 - AP_7$ | 236 | 253 | 0.0890 | 0.0949 |
| $T_4$ | $AP_6$ | $AP_4$ | $AP_6 - AP_5 - AP_4$ | $AP_6 - AP_3 - AP_4$ | 146 | Fail to reach destination | $3.7654 \times 10^{-4}$ | 1 |
| $T_5$ | $AP_9$ | $AP_1$ | $AP_9 - AP_6 - AP_3 - AP_2 - AP_1$ | $AP_9 - AP_6 - AP_3 - AP_2 - AP_1$ | 229 | 229 | 0.0867 | 0.0867 |

However at $T_1$ and $T_3$, the path loss and the outage probabilities of DPS-CMM model are less than PS-ISNR model which depicts that lesser the path loss value and the outage probability, better is the connectivity for end-to-end communication. At time instant $T_4$, the path loss value of dynamic path selection model is 146 dBm while PS-ISNR method failed to reach its destination. Hence the outage probability of PS-ISNR method is one which depicts that source mobile robot ($R_s$) 312 fails to connect to destination mobile robot ($R_d$) 314 through multi-hop Access Points (APs).

Figure 6:
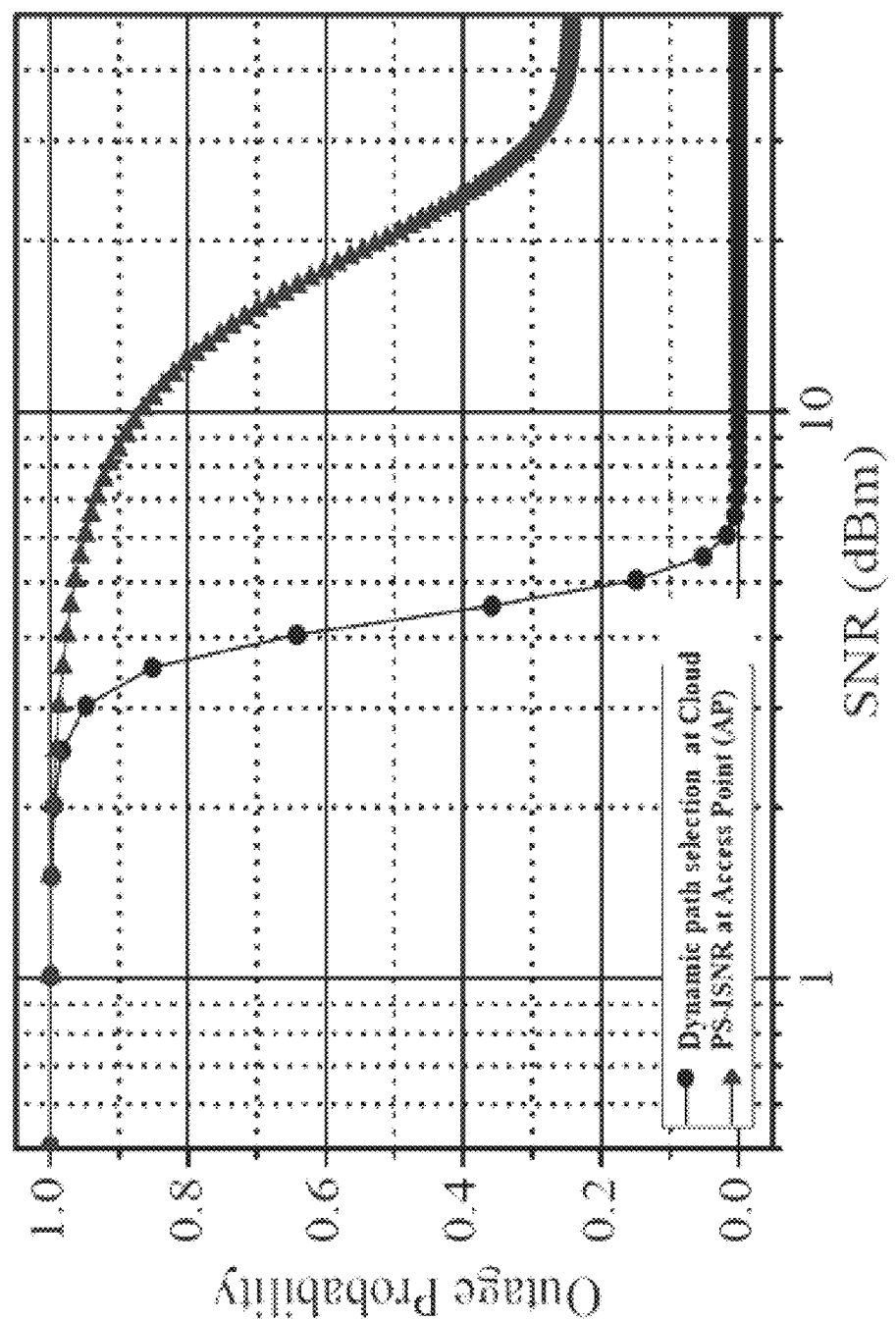
FIG. 6 is a graphical illustration of outage probability for evaluating the performance of an optimal path determined by the cloud system 102 based on dynamic path selection model, in conjunction with the method FIG. 4, in accordance with some embodiments of the present disclosure.

FIG. 6 is a graphical illustration of outage probability for evaluating the performance of an optimal path determined by the cloud system 102 based on dynamic path selection model, in conjunction with the method FIG. 4, in accordance with some embodiments of the present disclosure. The outage probability is computed for the selected paths over each iteration by varying the $\chi R_s$ (transmitted Signal to Noise Ratio (SNR) of the source mobile robot ($R_s$) 312 using the selected path dynamically wherein, the transmitted power is compared with the Path Selection using an Instantaneous Signal to Noise Ratio (PS-ISNR) method for the multi-hop network. Considering the following parameters, $$\sigma^2_{R_s-R_d} = \sigma^2_{R_s-AP_i} = \sigma^2_{b-(b+1)} = 1,$$

$$\sigma^2_{I-R_d} = \sigma^2_{I-AP_i} = \sigma^2_{I-(b+1)} = 0.2,$$

M=9, Z=4, $\chi_I$=5 dBm and DR=30 bits/min/Hz to make the computation of outage probabilities.

The optimal path determined based on the dynamic path selection model computes the outage probability with reference to the transmitted power and compares with the Path Selection using Instantaneous Signal to Noise Ratio (PS-ISNR) method. The outage probability computed using the above model decreases exponentially with the increase in transmitted signal as compared to the PS-ISNR method. However, the outage probability is too high for good value of SNR ($0 < \chi R_s < 5$) where the value of $\chi_I$ is assumed to be 5 dBm. The value of outage probability is high until the value of $\chi R_s$ is much less than $\chi_I$, which indicates that the transmitted signal would not be able to reach the destination as the interference is too high over such instant. As the value of $\chi R_s$ approaches to $\chi_I$, the value of outage probability decreases exponentially. Further, the outage probability saturates at higher value of $\chi R_s$ as the interference signal would not have influence over the transmitted signal. The dynamic path selection model in a large warehouse network needs complex computation that requires network hardware to run the program. Therefore, implementing the dynamic path selection model at the cloud system is feasible rather than deciding the path selection method at each hop as considered in PS-ISNR method. Further, the robot battery degrades more quickly while implementing path selection using instantaneous signal to noise ratio (PS-ISNR) method as compared to the proposed dynamic path selection due to such heavy computation at robot level. Hence, the lifetime of dynamic path selection model is more compared to the path selection using instantaneous signal to noise ratio (PS-ISNR) method. Moreover, the dynamic path selection model at the cloud system is efficient, since they have the entire knowledge about the network topology whereas the path selection using instantaneous signal to noise ratio (PS-ISNR) method only contains the information about the next hop. Hence, dynamic path selection model computes the best possible path between a source mobile robots ($R_s$) 312 to the destination mobile robot ($R_d$) 314 through intermediate Access Points (APs) as compared to the existing system where the path selected is suboptimal. Since dynamic path selection model has lower outage probability, the destination mobile robot ($R_d$) 314 receives better transmitted signal from the source mobile robot ($R_s$) 312 through the selected optimal path. The dynamic path selection model provides better approach than PS-ISNR method for selecting path in a multi-hop network. The source mobile robot ($R_s$) 312 to the destination mobile robot ($R_d$) 314 through one or multiple Access Points (APs) is captured at interval T. The captured mobility pattern of the source mobile robot ($R_s$) 312 and the destination mobile robot ($R_d$) 314 obtains the same navigable paths follow the same route. The disclosed cloud system determining an optimal path selected based on dynamic path selection model provides advantage over the existing path planning approaches. The cloud system determining optimal path based on dynamic path selection model has lower outage probability and the destination mobile robot receives better transmitted signal from the source mobile robot through the optimal path. The proposed cloud system provides better signal strength for end-to-end communication in the multi-hop network and can be utilized for any application with lower outage probabilities. The system dynamically decreases exponentially with the increase in transmitted signal. Moreover, the selection of optimal path computed at the cloud system is efficient, since they have global knowledge about the network topology.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other related forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random Access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method providing a cloud system (102) based dynamic path selection in a multi-hop network, the method comprising:

determining, by one or more processors (202) of the cloud system (102), an optimal path for establishing a communication between a source mobile robot ($R_s$) 312 and a destination robot ($R_d$) 314 among a plurality of mobile robots in the multi-hop network in accordance with a subnet information comprising a network map and a cost map, wherein the subnet information is received from a plurality of Access Points (APs) in the multi-hop network, and wherein the determined optimal path defines a multi-hop sequence of Access Points (APs), selected from the plurality of Access Points (APs), to enable the communication between the source mobile robot ($R_d$) 312 and the destination mobile robot ($R_d$) 314, wherein, determining the optimal path comprises:

identifying, a plurality of paths for communication between the source mobile robot ($R_s$) 312 and the destination mobile robot ($R_d$) 314 by:

establishing, a forward link between the source mobile robot and the destination mobile robot by computing a forward link cost function at each Access Point (AP) starting from a first Access point (AP) among the plurality of Access points (APs) connected to the source mobile robot ($R_s$) 312 and a first set of intermediate Access points (APs) among the plurality of Access points (APs) that terminate at a second Access Point (AP) connected to the destination mobile robot ($R_d$) 314, wherein the initial value of the forward link cost function at the first Access Point (AP) is set to zero; and establishing, a backward link between the destination mobile robot 314 and the source mobile robot ($R_s$) 312 by computing a backward link cost function at each Access Point (AP) starting from the second Access Point (AP) connected to the destination mobile robot ($R_d$) 314 and a second set of intermediate Access Points (APs) among the plurality of Access Points (APs) that terminate at the first Access Point (AP) connected to the source mobile robot 312, wherein the initial value of the backward cost function is set to the computed final forward cost function at the second Access Point (AP); and selecting, the optimal path for communication between the source mobile robot ($R_s$) 312 and the destination mobile robot ($R_d$) 314 from the identified plurality of paths comprising the multi-hop sequence of Access Points (APs), wherein an end-to-end forward link cost function and an end-to-end backward link cost function computed for the selected optimal path is minimum, and an end-to-end Outage Probability value for the optimal path is minimum; and communicating, the optimal path to the source mobile robot 312 by broadcasting the optimal path through the plurality of Access Points (APs) to establish communication between the source mobile robot ($R_s$) 312 and the destination mobile robot ($R_d$) 314.

2. The method as claimed in claim 1, wherein the cloud system 102 identifies the first Access Point (AP) associated with the source mobile robot ($R_s$) 312 and the second Access Point (AP) associated with the destination mobile robot ($R_d$) 314, to compute the forward link cost function and the backward link cost function, from the network map provided by each Access Point (AP), wherein the network map of each Access Point (AP) provides a list of mobile robots connected to each Access Point (AP) and a list of Access Points (APs) connected to each Access Point (AP).

3. The method as claimed in claim 1, wherein the forward link cost function for a current Access Point (AP) is computed by summation of forward link cost function of an Access Point (AP) in previous hop and a value of a Cost Function (CF) parameter between the Access Point (AP) in previous hop and the current Access Point (AP).

4. The method as claimed in claim 3, wherein the cloud system (102) obtains the values of the Cost Function (CF) parameters for the plurality of mobile robots and the plurality of Access Points (APs) of the multi-hop network from the cost map received in the subnet information from the plurality of Access Points (APs) in the multi-hop network, wherein the Cost Function (CF) parameters are computed by each Access Point (AP) for communication link between each Access Point (AP) and the plurality of mobile robots, and each Access Point (AP) and Access Points (APs) connected to each Access Point (AP).

5. An cloud system (102) based dynamic path selection in a multi-hop network, wherein the dynamic path selection system (102) comprises:

a processor (202);

an Input/output (I/O) interface (204); and a memory (208) coupled to the processor (202), the memory (208) comprising:

a dynamic path selection module (212) is configured to:

determine, an optimal path for establishing communication between a source mobile robot ($R_s$) 312 and a destination robot ($R_d$) 314 among a plurality of mobile robots in the multi-hop network in accordance with a subnet information comprising a network map and a cost map, wherein the subnet information is received from a plurality of Access Points (APs) in the multi-hop network, and wherein the determined optimal path defines a multi-hop sequence of Access Points (APs), selected from the plurality of Access Points (APs), to enable the communication between the source mobile robot ($R_s$) 312 and the destination mobile robot ($R_d$) 314, wherein, determining the optimal path comprises to:

identify a plurality of paths for communication between the source mobile robot ($R_s$) 312 and the destination mobile robot ($R_d$) 314 by:

establish, a forward link between the source mobile robot ($R_s$) 312 and the destination mobile robot ($R_d$) 314 by computing a forward link cost function at each Access point (AP) starting from a first Access point (AP) among the plurality of Access Points (APs) connected to the source mobile robot ($R_s$) 312 and a first set of intermediate Access Points (APs) among the plurality of Access Points (APs) that terminate at a second Access Point (AP) connected to the destination mobile robot ($R_d$) 314, wherein the initial value of the forward link cost function at the first Access Point (AP) is set to zero; and establish, a backward link between the destination mobile robot ($R_d$) 314 and the source mobile robot ($R_s$) 312 by computing a backward link cost function at each Access Point (AP) starting from the second Access Point (AP) connected to the destination mobile robot ($R_d$) 314 and a second set of intermediate Access Points (APs) among the plurality of Access Points (APs) that terminate at the first Access Point (AP) connected to the source mobile robot ($R_s$) 312, wherein the initial value of the backward cost function is set to the computed final forward cost function at the second Access Point (AP); and select, the optimal path for communication between the source mobile robot ($R_s$) 312 and the destination mobile robot ($R_d$) 314 from the identified plurality of paths comprising the multi-hop sequence of Access Points (APs), wherein an end-to-end forward link cost function and an end-to-end backward link cost function computed for the selected optimal path is minimum, and an end-to-end Outage Probability value for the optimal path is minimum; and communicate, the optimal path to the source mobile robot ($R_s$) 312 by broadcasting the optimal path through the plurality of Access Points (APs) to establish communication between the source mobile robot ($R_s$) 312 and the destination mobile robot ($R_d$) 314.

6. The cloud system (102) as claimed in claim 5, wherein the cloud system 102 is configured to identify the first Access Point (AP) associated with the source mobile robot ($R_s$) 312 and the second Access Point (AP) associated with the destination mobile robot ($R_d$) 314, to compute the forward link cost function and the backward link cost function, from the network map provided by each Access Point (AP), wherein the network map of each Access Point (AP) provides a list of mobile robots connected to each Access Point (AP) and a list of Access Points (APs) connected to each Access Point (AP).

7. The cloud system (102) as claimed in claim 5, wherein the forward link cost function for a current Access Point (AP) is computed by summation of forward link cost function of an Access Point (AP) in previous hop and a value of a Cost Function (CF) parameter between the Access Point (AP) in previous hop and the current Access Point (AP).

8. The cloud system (102) as claimed in claim 7, wherein the cloud system (102) is configured to obtain the values of the Cost Function (CF) parameters for the plurality of mobile robots and the plurality of Access Points (APs) of the multi-hop network from the cost map received in the subnet information from the plurality of Access Points (APs) in the multi-hop network, wherein the Cost Function (CF) parameters are computed by each Access Point (AP) for communication link between each Access Point (AP) and the plurality of mobile robots, and each Access Point (AP) and Access Points (APs) connected to each Access Point (AP).

9. One or more non-transitory machine readable information storage mediums comprising one or more instructions which when executed by one or more hardware processors perform actions comprising:
   determining, by one or more processors (202) of the cloud system (102), an optimal path for establishing a communication between a source mobile robot ($R_s$) 312 and a destination robot ($R_d$) 314 among a plurality of mobile robots in the multi-hop network in accordance with a subnet information comprising a network map and a cost map, wherein the subnet information is received from a plurality of Access Points (APs) in the multi-hop network, and wherein the determined optimal path defines a multi-hop sequence of Access Points (APs), selected from the plurality of Access Points (APs), to enable the communication between the source mobile robot ($R_d$) 312 and the destination mobile robot ($R_d$) 314,
   wherein, determining the optimal path comprises:
      identifying, a plurality of paths for communication between the source mobile robot ($R_s$) 312 and the destination mobile robot ($R_d$) 314 by:
         establishing, a forward link between the source mobile robot and the destination mobile robot by computing a forward link cost function at each Access Point (AP) starting from a first Access point (AP) among the plurality of Access points (APs) connected to the source mobile robot ($R_s$) 312 and a first set of intermediate Access points (APs) among the plurality of Access points (APs) that terminate at a second Access Point (AP) connected to the destination mobile robot ($R_d$) 314, wherein the initial value of the forward link cost function at the first Access Point (AP) is set to zero; and
         establishing, a backward link between the destination mobile robot 314 and the source mobile robot ($R_s$) 312 by computing a backward link cost function at each Access Point (AP) starting from the second Access Point (AP) connected to the destination mobile robot ($R_d$) 314 and a second set of intermediate Access Points (APs) among the plurality of Access Points (APs) that terminate at the first Access Point (AP) connected to the source mobile robot 312, wherein the initial value of the backward cost function is set to the computed final forward cost function at the second Access Point (AP); and
      selecting, the optimal path for communication between the source mobile robot ($R_s$) 312 and the destination mobile robot ($R_d$) 314 from the identified plurality of paths comprising the multi-hop sequence of Access Points (APs), wherein an end-to-end forward link cost function and an end-to-end backward link cost function computed for the selected optimal path is minimum, and an end-to-end Outage Probability value for the optimal path is minimum; and
      communicating, the optimal path to the source mobile robot 312 by broadcasting the optimal path through the plurality of Access Points (APs) to establish communication between the source mobile robot ($R_s$) 312 and the destination mobile robot ($R_d$) 314.

10. The one or more non-transitory machine readable information storage mediums of claim 9, wherein the cloud system 102 identifies the first Access Point (AP) associated with the source mobile robot ($R_s$) 312 and the second Access Point (AP) associated with the destination mobile robot ($R_d$) 314, to compute the forward link cost function and the backward link cost function, from the network map provided by each Access Point (AP), wherein the network map of each Access Point (AP) provides a list of mobile robots connected to each Access Point (AP) and a list of Access Points (APs) connected to each Access Point (AP).

11. The one or more non-transitory machine readable information storage mediums of claim 9, wherein the forward link cost function for a current Access Point (AP) is computed by summation of forward link cost function of an Access Point (AP) in previous hop and a value of a Cost Function (CF) parameter between the Access Point (AP) in previous hop and the current Access Point (AP).

12. The one or more non-transitory machine readable information storage mediums of claim 9, wherein the cloud system (102) obtains the values of the Cost Function (CF) parameters for the plurality of mobile robots and the plurality of Access Points (APs) of the multi-hop network from the cost map received in the subnet information from the plurality of Access Points (APs) in the multi-hop network, wherein the Cost Function (CF) parameters are computed by each Access Point (AP) for communication link between each Access Point (AP) and the plurality of mobile robots, and each Access Point (AP) and Access Points (APs) connected to each Access Point (AP).

* * * * *